United States Patent
Grün et al.

(10) Patent No.: US 11,572,842 B2
(45) Date of Patent: Feb. 7, 2023

(54) COUPLING ARRANGEMENT

(71) Applicant: Purem GmbH, Neunkirchen (DE)

(72) Inventors: Matthias Grün, Altbach (DE); Markus Birgler, Wernau (DE); Markus Lory, Stuttgart (DE); Andreas Wacker, Plochingen (DE); Annika Zeumer, Wernau (DE); Ralph Schenk, Stuttgart (DE); Miljenko Novosel, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/579,411

(22) Filed: Jan. 19, 2022

(65) Prior Publication Data
US 2022/0228534 A1 Jul. 21, 2022

(30) Foreign Application Priority Data
Jan. 20, 2021 (DE) ...................... 10 2021 101 135.3

(51) Int. Cl.
*F02D 9/10* (2006.01)
*F16K 31/04* (2006.01)
*F02D 9/04* (2006.01)

(52) U.S. Cl.
CPC ............. *F02D 9/1065* (2013.01); *F02D 9/04* (2013.01); *F16K 31/043* (2013.01)

(58) Field of Classification Search
CPC ......... F02D 9/1065; F02D 9/04; F16K 31/043
USPC ....................................................... 123/337
See application file for complete search history.

(56) References Cited

U.S. PATENT DOCUMENTS

| | | | |
|---|---|---|---|
| 6,918,401 B1* | 7/2005 | Vanderveen | F02D 9/1065 251/308 |
| 2011/0297862 A1* | 12/2011 | Womann | F02D 9/04 251/305 |
| 2017/0284310 A1 | 10/2017 | Delplanque et al. | |
| 2018/0238209 A1* | 8/2018 | Suzuki | F01N 1/165 |
| 2020/0095945 A1 | 3/2020 | Zeumer et al. | |
| 2020/0095946 A1 | 3/2020 | Zeumer et al. | |

(Continued)

FOREIGN PATENT DOCUMENTS

| | | | | |
|---|---|---|---|---|
| DE | 102015222609 A1 * | 5/2017 | ............... | F02D 9/04 |
| DE | 10 2017 105 889 A1 | 10/2017 | | |
| DE | 102017222465 A1 * | 6/2019 | ............... | F02D 9/04 |

(Continued)

*Primary Examiner* — Mahmoud Gimie
(74) *Attorney, Agent, or Firm* — Walter Ottesen, P.A.

(57) ABSTRACT

A coupling arrangement is disclosed for rotationally coupling a drive element of a pivoting drive of an exhaust-gas flap for the exhaust-gas flow to a pivot shaft that is rotatable about a pivot axis. A first coupling element has a coupling region coupled to the pivot shaft for conjoint rotation about the pivot axis and a second coupling element has a coupling region coupled to the drive element for conjoint rotation about the pivot axis. A preload element acts on the first coupling element and the second coupling element substantially in a peripheral direction with respect to one another. One of the coupling elements has two rotational coupling projections which extend radially outward with respect to the coupling region of the coupling element. The other coupling element includes, so as to be assigned to each rotational coupling projection, a rotational coupling cutout which receives the corresponding rotational coupling projection.

22 Claims, 3 Drawing Sheets

(56) References Cited

U.S. PATENT DOCUMENTS

2021/0246841 A1  8/2021  Edler et al.

FOREIGN PATENT DOCUMENTS

| DE | 10 2011 107 088 C5 | 10/2019 | | |
|----|----|----|----|----|
| DE | 10 2018 123 403 A1 | 3/2020 | | |
| DE | 102014118492 B4 * | 5/2020 | ............ | F01N 13/08 |
| DE | 10 2020 103 420 A1 | 8/2021 | | |
| EP | 3 626 952 A1 | 3/2020 | | |

* cited by examiner

COUPLING ARRANGEMENT

CROSS REFERENCE TO RELATED APPLICATION

This application claims priority of German patent application no. 10 2021 101 135.3, filed Jan. 20, 2021, the entire content of which is incorporated herein by reference.

TECHNICAL FIELD

The present disclosure relates to a coupling arrangement for the coupling of a drive shaft of a pivoting drive of an exhaust-gas flap for the exhaust-gas flow of an internal combustion engine to a pivot shaft that is rotatable about a pivot axis and that supports a flap plate.

BACKGROUND

A coupling arrangement of this kind is known from DE 10 2011 107 088 C5. In the case of the coupling arrangement, the first coupling element, which is held rotationally conjointly on the pivot shaft, has two rotational coupling projections which radially outwardly engage in rotational coupling cutouts of the second coupling element which is held rotationally conjointly on the drive element of the pivoting drive. In order to minimize the heat transfer between the two coupling elements, they contact each other exclusively in the region of peripheral support regions which are formed on the rotational coupling projections and which are supported in the peripheral direction on counterpart peripheral support regions that delimit rotational coupling cutouts receiving the rotational coupling projections.

SUMMARY

An object of the present disclosure is to provide a coupling arrangement for the rotational coupling of a drive element of a pivoting drive of an exhaust-gas flap for the exhaust-gas flow of an internal combustion engine to a pivot shaft that is rotatable about a pivot axis, in the case of which coupling arrangement defined positioning of two coupling elements, which connect a drive element to a pivot shaft, substantially transversely with respect to the pivot axis is ensured.

According to the disclosure, the object is achieved by a coupling arrangement for the rotational coupling of a drive element of a pivoting drive of an exhaust-gas flap for the exhaust-gas flow of an internal combustion engine to a pivot shaft that is rotatable about a pivot axis.

The coupling arrangement includes:
a first coupling element having a coupling region which is to be coupled to a pivot shaft for conjoint rotation about the pivot axis,
a second coupling element having a coupling region which is to be coupled to a drive element for conjoint rotation about the pivot axis,
a preload element for generating a force which acts on the first coupling element and the second coupling element substantially in a peripheral direction with respect to one another,
one coupling element of the first coupling element and second coupling element including at least two rotational coupling projections which extend radially outward with respect to the coupling region of the coupling element, and the other coupling element of the first coupling element and the second coupling element including, so as to be assigned to each rotational coupling projection of the one coupling element, a rotational coupling cutout which receives the rotational coupling projection, a peripheral support region being provided on each rotational coupling projection and each rotational coupling cutout being delimited in the peripheral direction by a counterpart peripheral support region, the peripheral support region of each rotational coupling projection received in a rotational coupling cutout being preloaded by the preload element so as to abut against the counterpart peripheral support region of the rotational coupling cutout receiving a respective rotational coupling projection.

The coupling arrangement is distinguished in that a radial support region which substantially radially supports the one coupling element with respect to the other coupling element is provided on the one coupling element so as to be assigned to at least one rotational coupling projection, in the peripheral direction, on at least one side of the rotational coupling projection.

In a construction of a coupling arrangement according to the disclosure, the two coupling elements are not only supported in the peripheral direction with respect to one another but also via at least one radial support region, via which defined positioning of the two coupling elements substantially transversely with respect to a pivot axis is ensured. Although each radial support region is therefore associated with the introduction of additional heat-transmitting contact between the two coupling elements, the contact, which serves to support the two coupling elements relative to one another substantially transversely with respect to their pivot axis, ensures defined positioning of the two contact elements with respect to one another and thus defined centering of same with respect to the pivot axis.

In order to be able to provide an abutment on the other coupling element for such a radial support region on the one coupling element, it is proposed that two rotational coupling fingers which extend substantially axially in the direction away from the coupling region of the other coupling element and which delimit between them a rotational coupling cutout are provided on the other coupling element for the purpose of providing a respective rotational coupling cutout, and that at least one, preferably each, radial support region is supported on a rotational coupling finger.

In this case, for a stable construction, a rotational coupling arm which extends substantially axially away from the coupling region of the other coupling element and which has two rotational coupling fingers may be provided on the other coupling element for the purpose of providing a respective rotational coupling cutout.

For low heat transfer between the coupling region of the other coupling element and the rotational coupling arms, a cutout which can preferably be T-shaped or/and which extends in the direction of the assigned rotational coupling arm may be formed in the coupling region of the other coupling element so as to be assigned to at least one, preferably each, rotational coupling arm.

For a configuration which promotes defined relative positioning of the two coupling elements, a radial support region which substantially radially supports the one coupling element with respect to the other coupling element may be provided so as to be assigned to at least one rotational coupling projection, in the peripheral direction, on both sides of the rotational coupling projection.

In order to also keep the heat transfer as low as possible in spite of the additional contact introduced between the two coupling elements, it is proposed that at least one, preferably each, radial support region includes a radial support projection which is arranged with a peripheral spacing to the assigned rotational coupling projection.

In a compact, stable configuration, at least one, preferably each, radial support region may be provided on an outer peripheral region of the coupling region of the one coupling element.

In order to avoid overdeterminacy in terms of the relative positioning of the two coupling elements, it is proposed that a radial support region which substantially radially supports the one coupling element with respect to the other coupling element is provided so as to be assigned only to a single one of the rotational coupling projections, in the peripheral direction, on at least one side of the rotational coupling projection.

Here, in a peripheral region of a rotational coupling projection without the assigned radial support region, the outer peripheral region of the coupling region of the one coupling element may in particular be arranged at a radial spacing from the other coupling element for the purpose of further minimizing the heat transfer.

It is the case in particular when the preload element generates a force which preloads at least one, preferably each, radial support region so as to abut against the other coupling element that the radial support of the two coupling elements with respect to one another in the region of a single rotational coupling projection is sufficient for defined relative positioning of the two coupling elements.

In order to also hold the two coupling elements in an axially defined manner with respect to one another, it is further proposed that the preload element is configured to generate an axial force, which acts in an axial direction, between the first coupling element and the second coupling element, that each rotational coupling cutout is open axially in the direction away from the coupling region of the other coupling element for the purpose of receiving the assigned rotational coupling projection, and that the one coupling element is held axially on the other coupling element by the preload element so as to prevent the rotational coupling projections from moving out of the rotational coupling cutouts that receive them.

In order for the force which is to be transmitted via the two coupling elements to be distributed uniformly in the peripheral direction, two rotational coupling projections which extend away from one another in a substantially diametrically opposed manner with respect to the pivot axis may be provided on the one coupling element.

The preload element may include a preload spring having a first support region which is supported at least in a first peripheral direction with respect to the first coupling element and at least axially in the direction of the second coupling element and which is provided for example by a winding end portion, and having a second support region which is supported at least in a second peripheral direction, opposite to the first peripheral direction, with respect to the second coupling element and at least axially in the direction of the first coupling element and which is provided for example by a further winding end portion.

The coupling region of the first coupling element may be of substantially plate-like form, or/and the coupling region of the first coupling element may have a positively locking engagement formation for rotational coupling to the pivot shaft.

Equally, the coupling region of the second coupling element may be of substantially plate-like form, or/and the coupling region of the second coupling element may have a positively locking engagement formation for rotational coupling to the drive element.

The disclosure also relates to an exhaust-gas flap, in particular for the exhaust-gas flow of an internal combustion engine, including a flap plate which is supported, in the interior of a flap pipe, on a pivot shaft that is rotatable about a pivot axis, and also a pivoting drive with a drive element, further including a coupling arrangement constructed in accordance with the disclosure for the rotational coupling of the pivot shaft to the drive element.

BRIEF DESCRIPTION OF THE DRAWINGS

The invention will now be described with reference to the drawings wherein.

DESCRIPTION OF THE PREFERRED EMBODIMENTS

Figure 1:
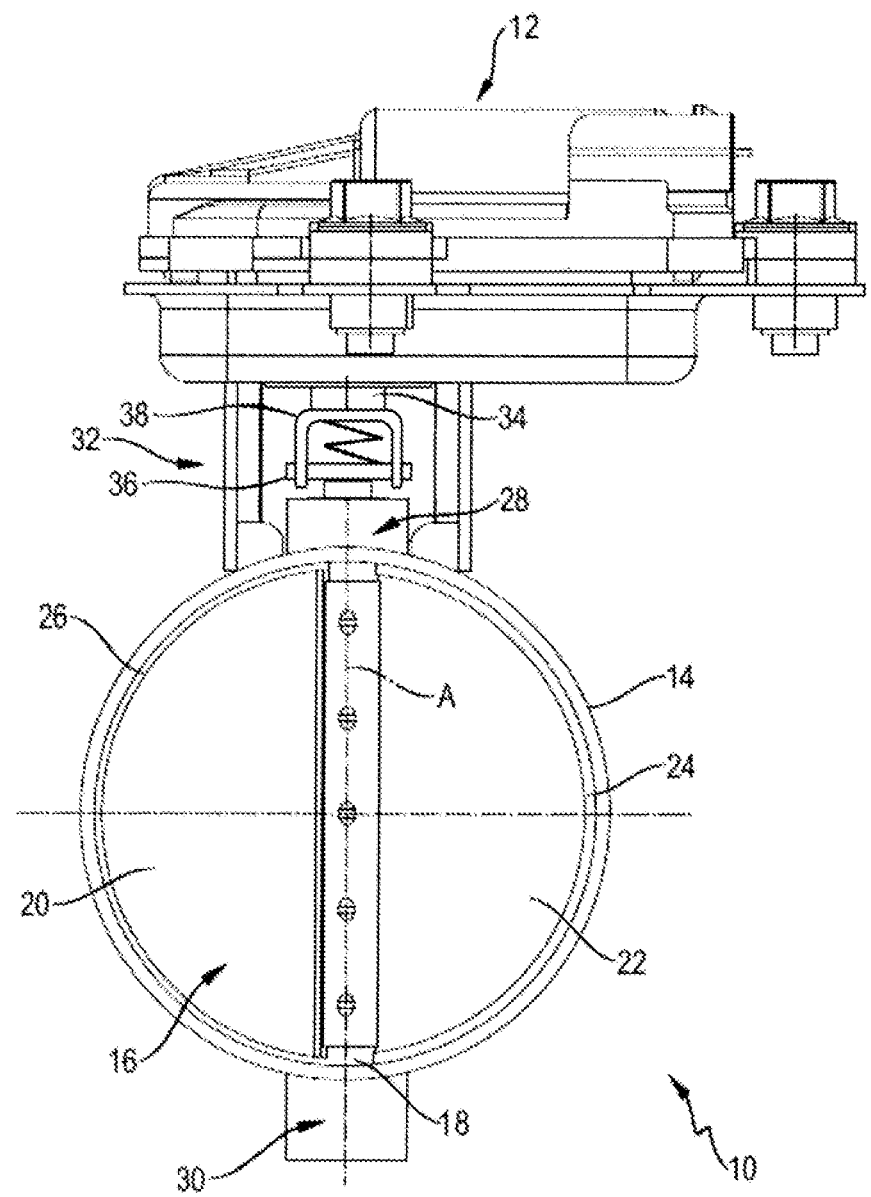
FIG. 1 shows an exhaust-gas flap for the exhaust-gas flow of an internal combustion engine.

FIG. 1 shows a side view of an exhaust-gas flap which is denoted generally by 10 and which can be used, for example, in an exhaust-gas system of an internal combustion engine and which has a flap drive 12. The exhaust-gas flap 10 includes a flap pipe 14 in which a flap plate denoted generally by 16 is supported, pivotably about a pivot axis A, on a pivot shaft 18. The flap plate 16 includes two flap wings 20, 22 which, in the case of a flap plate 16 positioned in a shut-off position, lie against wing stops 24, 26 provided on the inner circumference of the flap pipe 14.

The pivot shaft 18 is, at its two axial end regions 28, 30, supported so as to be rotatable or pivotable relative to the flap pipe 14 about the pivot axis A via respective bearing arrangements. In its first axial end region 28, the pivot shaft 18 is coupled via a coupling arrangement 32 described below to a drive element 34 of the flap drive 12, for example a drive shaft, for conjoint rotation about the pivot axis A.

Figure 2:
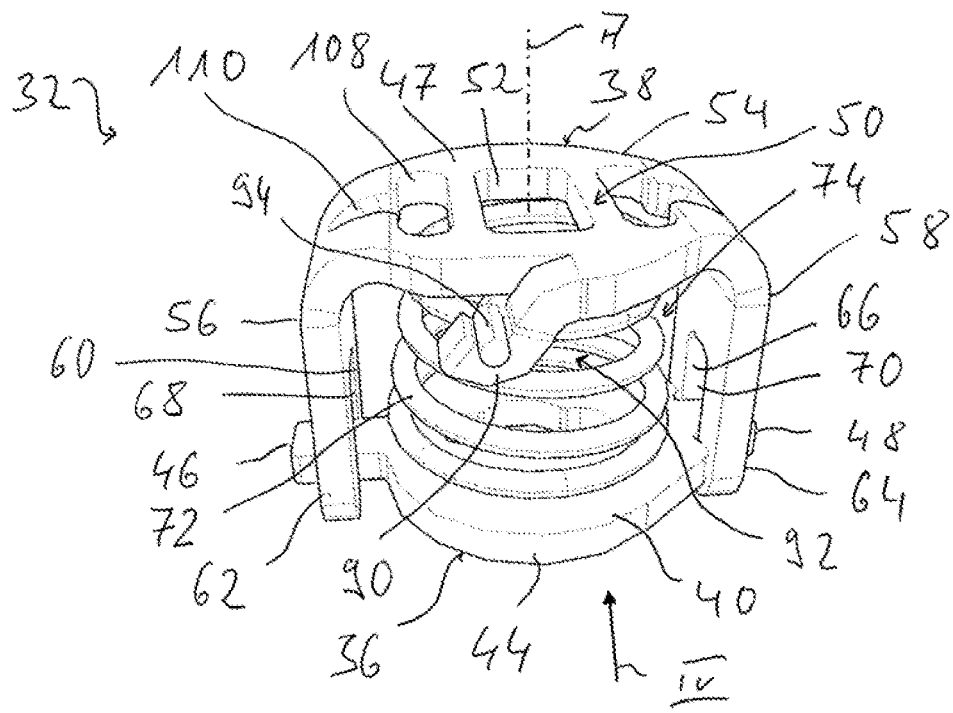
FIG. 2 shows a perspective view of a coupling arrangement for an exhaust-gas flap.
Figure 3:
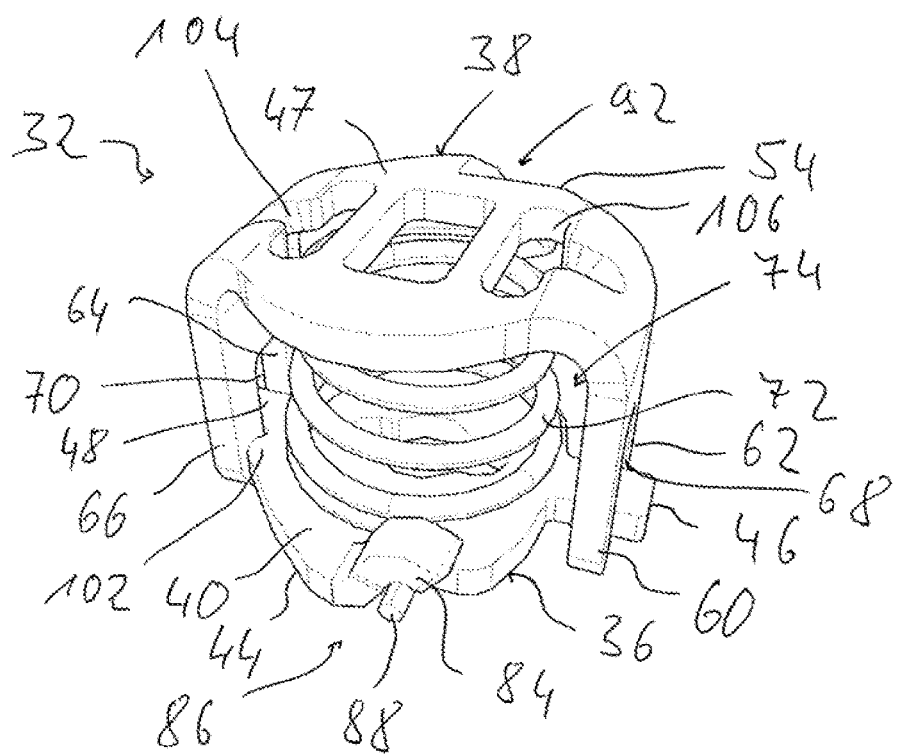
FIG. 3 shows a perspective view of the coupling arrangement of FIG. 2.
Figure 4:
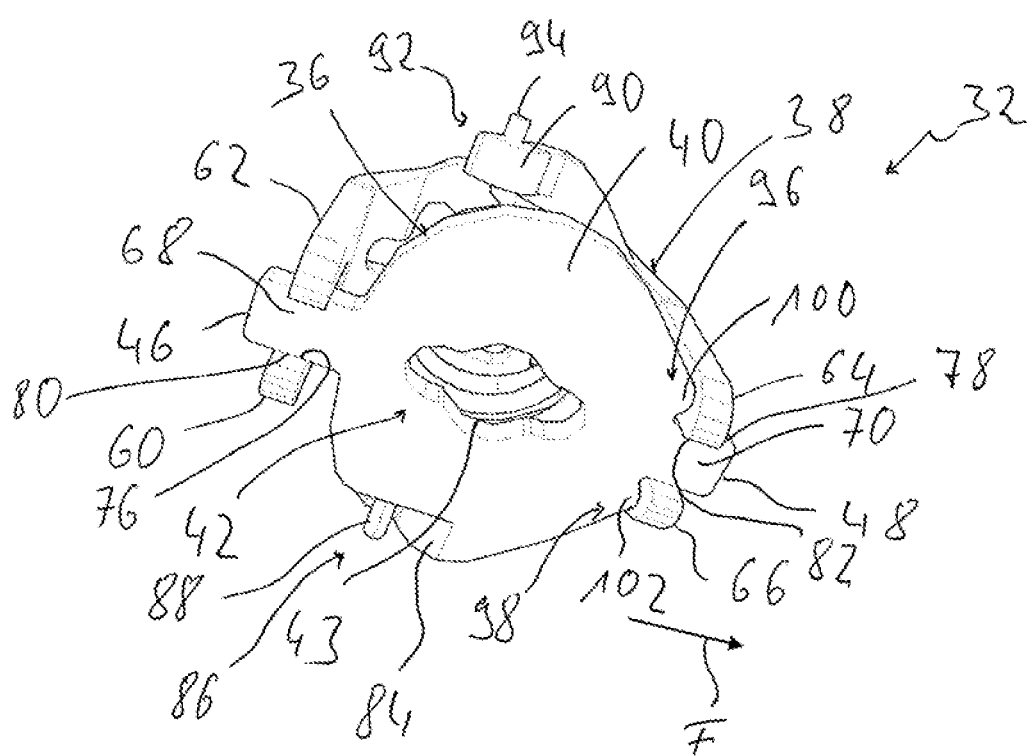
FIG. 4 shows a view of the coupling arrangement of FIG. 2 in viewing direction IV in FIG. 2.

The coupling arrangement 32 is illustrated in detail in FIGS. 2 to 4. The coupling arrangement 32 includes a first coupling element 36 which is rotationally conjointly coupled to the pivot shaft 18, and a second coupling element 38 which is rotationally conjointly coupled to the drive element 34 of the pivoting drive 12. The first coupling element 36, which is provided for example in the form of a sheet-metal part, includes a plate-like coupling region 40 having a positively locking engagement formation 42 formed in a central region. The positively locking engagement formation is provided by an opening 43 having a non-rotationally symmetrical opening cross section, a correspondingly shaped portion of the pivot shaft 18 being able to be positioned so as to engage into the opening. On two regions of the coupling region 40 that are arranged diametrically opposite one another with respect to the pivot axis, two rotational coupling projections 46, 48 extend radially outward from an outer peripheral region 44 of the coupling region in a diametrically opposed manner with respect to one another.

The second coupling element 38, which is likewise provided for example in the form of a sheet-metal component, includes a plate-like coupling region 47 having a positively locking engagement formation 50 formed in a central region thereof. The positively locking engagement formation may also have an opening 52 having a non-rotationally symmetrical opening cross section with respect to the pivot axis A, a correspondingly shaped region of the drive element 34 being able to be positioned so as to engage into the opening. On an outer peripheral region 54 of the plate-like coupling region 47 of the second coupling element 38, regions lying diametrically opposite one another with respect to the pivot axis A have coupling arms 56, 58 that extend from the coupling region 47 substantially in the direction of the pivot axis A toward the first coupling element 36. Two rotational coupling fingers 60, 62 and 64, 66, respectively, which extend axially in the direction of the first coupling element 36, are provided on each of the two rotational coupling arms 56, 58. The rotational coupling fingers 60, 62 and 64, 66, respectively, that are provided on a respective rotational coupling arm 56, 58 delimit between them, in the peripheral direction, a respective rotational coupling cutout 68, 70. The two rotational coupling cutouts are open axially in the direction away from the coupling region 47 of the second coupling element 38 such that, when the coupling arrangement 32 is being assembled, the two rotational coupling projections 46, 48 of the first coupling element 36 can be axially introduced into the rotational coupling cutout 68, 70 until they are held in the peripheral direction between the rotational coupling fingers 60, 62 and 64, 66, respectively, that delimit a respective rotational coupling cutout 68, 70. On the second coupling element 38, however, there are no portions engaging behind that side of the first coupling element which faces away from the coupling region 47 of the second coupling element 38 and thus having the effect of axially holding together the two coupling elements 36, 38 or producing axially positively locking engagement thereof.

The coupling arrangement 32 further includes a preload element 74 in the form of a preload spring 72, for example in the form of a helical spring having a plurality of spring windings. The preload spring 72 is arranged substantially between the two coupling elements 36, 38 and is axially supported on the mutually facing axial sides of the coupling regions 40, 47 of the two coupling elements 36, 38. The preload element 74 generates a peripheral force which acts on the two coupling elements 36, 38 in the peripheral direction with respect to one another for movement purposes. In the illustration of FIG. 4, the peripheral force acts on the first coupling element 36 in the counter-clockwise direction, such that the peripheral support regions 76, 78 of the first coupling element 36 which are formed on the two rotational coupling projections 46, 48 thereof are preloaded so as to abut against counterpart peripheral support regions 80, 82 which are formed on the rotational coupling fingers 60 and 64, respectively, and which thus delimit the rotational coupling cutouts 68, 70 in the peripheral direction. It should be pointed out that the peripheral support regions 76, 78 and the counterpart peripheral support regions 80, 82 may be provided by area regions of the two coupling elements 36, 38 that can be brought into abutment against one another.

In order to generate the preload force which acts on the coupling elements 36, 38 in the peripheral direction with respect to one another and via which the rotational coupling projections 46, 48 are preloaded so as to abut against the rotational coupling fingers 60, 64, the first coupling element 36 has a holding region 86, which is provided by a holding lug 84, on the outer peripheral region 44 of the coupling region 40. The holding lug 84 may be provided for example by bending out of the plane of the coupling region 40 of the first coupling element 36 and engages over a substantially radially outwardly protruding holding limb 88, which provides a support region of the preload element 74, of the preload spring 72 axially completely on a peripheral side thereof and substantially completely in the peripheral direction on the axial side facing the second coupling element 38. FIG. 2 shows that the holding lug 84 may also engage axially in part over the other peripheral side of the holding limb 88, in order to achieve defined mounting of the holding limb 88, which is provided by a radially outwardly extending winding end region of the preload spring 72, in both peripheral directions.

A holding region 92, which is also provided by a holding lug 90, for a holding limb 94 of the preload spring 72 is provided on the second coupling element 38, the holding limb being provided by a radially outwardly extending winding end region which forms a further support region of the preload element 74 at the other axial end of the preload spring 72. The holding lug 90 engages over the holding limb 94 in an axially complete manner and in the peripheral direction on that side of the holding limb 94 which axially faces the first coupling element 36. The holding lug 90, which may also be provided by bending out of the plane of the coupling region 47 of the second coupling element 38, may also engage axially in part over the other peripheral side of the holding limb 94, so that here, too, defined positioning of the holding limb 94 in both peripheral directions is ensured.

The two holding regions 86, 92 or, respectively, the holding lugs 84, 90 thereof engage over the holding limbs 88, 94 assigned thereto in mutually opposite axial directions and peripheral directions. In this way, firstly the possibility of using preloaded installation of the preload spring 72 to generate the peripheral force or tangential force which preloads the two coupling elements 36, 38 in the peripheral direction with respect to one another is provided. At the same time, the possibility of coupling the two coupling elements 36, 38 to one another via the preload spring 72 for the purpose of transmitting an axial force is provided. It is recognized that the preload spring 72, in its two axial end regions, is not only held on the coupling elements 36, 38 via the respective holding regions 86, 92 by way of its holding limbs 88, 94 but is axially supported on the coupling regions 40, 47 of the coupling elements by way of its respective last windings. In the case that the two coupling elements 36, 38 move toward one another, the preload spring 72 can thus generate an axial force which forces the coupling elements axially apart from one another, such that, in the installed state, the coupling arrangement 32 held in an axially compressed manner between the pivot shaft 18 and the drive element 34 generates a force action that forces the pivot shaft 18 axially in the direction away from the drive element 34, as a result of which the pivot shaft 18 is held with defined axial positioning in the flap pipe 14.

By virtue of the fact that the holding limbs 88, 94 are engaged over in the peripheral direction by the holding lugs 84, 90 respectively assigned thereto on the side facing the respectively other coupling element, the preload spring 72 also generates an axial force between the two coupling elements 36, 38 in the direction toward one another if a force which moves the rotational coupling projections 46, 48 of the coupling element 36 axially out of the assigned rotational coupling cutouts 68, 70 acts on the coupling element. In a substantially completely relaxed state of the preload spring 72, the state being illustrated in FIGS. 2 to 4, the rotational coupling projections 46, 48 of the first coupling element 36 are positioned so as to engage into the assigned rotational coupling cutouts 68, 70, and the peripheral support regions 76, 78 of the first coupling element are held so as to abut against the counterpart peripheral support regions 80, 82 by the peripheral force generated via the preload spring 72. On account of the axial force action of the preload spring 72, an axial force which prevents the rotational coupling projections 46, 48 from moving axially out of the rotational coupling cutouts 68, 70 that receive them is thus provided in addition to the as a result of the frictionally locking engagement between the peripheral support regions 76, 78 and counterpart peripheral support regions 80, 82 that bear against one another. Although the axially open rotational coupling cutouts 68, 70 have the effect that the two coupling elements 36, 38 are thus not held directly against one another so as to be movable axially in a limited manner, a captive retention means for the two coupling elements 36, 38 is provided in an indirect manner, namely by the preload spring 72 connected to the two coupling elements 36, 38, and prevents the two coupling elements 36, 38 from detaching from one another prior to the integration in the exhaust-gas flap 10 illustrated in FIG. 1.

Since the captive retention function is provided by the preload spring 72, the rotational coupling cutouts 68, 70 receiving the two rotational coupling projections 46, 48 may be of axially open form, which simplifies the assembly of the coupling arrangement 32 considerably. Each of the two coupling elements 36, 38 may be provided in the configuration illustrated in the figures, in particular in the region of the rotational coupling projections 46, 48 or the rotational coupling arms 56, 58 and the rotational coupling fingers 60, 62, 64, 66 provided thereon, prior to the joining together with the respectively other coupling element. It is therefore not necessary for any shaping measures to be carried out during the assembly of the coupling arrangement 32 in order to be able to position the two rotational coupling projections 46, 48 so as to engage into the rotational coupling cutouts 68, 70 that receive them. It is merely necessary for the two coupling elements 36, 38, with a preload spring 72 positioned between them, to be rotated with respect to one another such that the rotational coupling projections 46, 48 are aligned in the peripheral direction with the rotational coupling cutouts 68, 70 that receive them, and then be moved axially toward one another until the two rotational coupling projections 46, 48 are positioned so as to engage into the rotational coupling cutouts 68, 70. In the course of the movement, the holding limbs 88, 94 of the preload spring 72 can be moved under the holding lugs 84, 90 respectively assigned thereto so as to be axially supported on the respective coupling regions 40, 47. Once the state has been reached, the regions of the holding lugs 84, 90 that engage over the assigned holding limbs 88, 94 may be bent slightly in the direction of the respective coupling regions 40, 47 again. Alternatively, the holding lugs 84, 90 may already have been provided with the shaping illustrated in the figures, and the preload spring 72 can be moved under the holding lugs 84, 90 by way of corresponding application of force on the holding limbs 88, 94.

As a result of the arrangement of the preload spring 72 between the two coupling elements 36, 38, in a state preloaded in the peripheral direction, a force which acts on the two coupling elements 36, 38 substantially radially or transversely with respect to one another is also generated in addition to a force action which acts on the coupling elements in the peripheral direction, that is, for rotation with respect to one another substantially about the pivot axis A. FIG. 4 illustrates the approximately radially oriented force F via which the first coupling element 36 is loaded in such a way that the outer peripheral region 44 of the coupling region 40 of the first coupling element is forced, in a region close to the rotational coupling projection 48, in the direction of the rotational coupling fingers 64, 66 of the second coupling element 38.

In order to ensure defined relative positioning of the two coupling elements 36, 38 transversely with respect to the pivot axis A whilst taking account of the force F, and in particular to ensure that the openings 43, 52 of the positively locking engagement formations 42, 50 are positioned with respect to one another and with respect to the pivot axis A in a substantially centered manner, radial support regions 96, 98 are provided on the outer peripheral region 44 of the coupling region 40 of the first coupling element 36 on both sides of the rotational coupling projection 48. Each radial support region 96, 98 includes a radial support projection 100, 102 which is provided with a peripheral spacing to the rotational coupling projection 48 and via which the first coupling element 36 is radially outwardly supported on the rotational coupling fingers 64, 66 positioned on both sides of the rotational coupling projection 48.

By virtue of the fact that, in the case of the coupling arrangement 32, the first coupling element 36 and the second coupling element 38 are not only supported relative to one another in the peripheral direction by the peripheral support regions 76, 78 and counterpart peripheral support regions 80, 82 that bear against one another or are preloaded toward one another, but a radial support is additionally also produced by radially acting contact between the radial support regions 100, 102 and the rotational coupling fingers 64, 66, defined relative positioning of the two coupling elements 36, 38 transversely with respect to the pivot axis A is also ensured in a manner assisted by the preload action of the preload spring 72. Although the additional contact between the two coupling elements 36, 38 in the region of the radial support projections 100, 102 and the rotational coupling fingers 64, 66 introduces additional heat-transmitting contact, which is to be avoided per se, between the two coupling elements 36, 38, defined relative positioning of the two coupling elements 36, 38 that prevents distortion during pivoting operation is ensured.

No radial support regions or radial support projections are provided so as to be assigned to the other rotational coupling projection 46, with the result that, in the peripheral region of the rotational coupling projection 46, the outer peripheral region 44 of the coupling region 40 has a radial spacing to the rotational coupling fingers 60, 62 of the second coupling element 38. As a result, on the one hand, contact between the two coupling elements 36, 38 that leads to additional heat transfer is avoided in the peripheral region. On the other hand, no overdeterminacy in terms of the definition of the position of the two coupling elements 36, 38 transversely with respect to the pivot axis A is introduced. Sufficiently defined positioning is ensured solely by the radial support projections 100, 102 and the force F generated via the preload spring 72.

A further contribution to reduced heat transfer may be made in that T-shaped cutouts 104, 106, the T arms 108 thereof extending substantially along the opening 52 in the plate-like coupling region 47 and the T stems 110 thereof, which proceed from the respective T arm 108, extending from the plate-like coupling region 47 in the direction away from the opening 52 into the transition region to the rotational coupling arms 56, 58 that adjoin the plate-like coupling region 47 and for example also into the rotational coupling arms 56, 58, are formed in the second coupling element 38 on both sides of the opening 52 formed in the plate-like coupling region 47. Each cutout 104, 106 of this kind contributes to a significantly reduced cross section for heat transfer particularly if the cutout extends completely through the construction material of the second coupling element 38.

In the construction of an exhaust-gas flap, and of a coupling arrangement therefor, described above and illustrated in the figures, various aspects can be embodied differently in terms of structure. For instance, it is for example possible for one or both coupling elements to also be firmly connected to the drive element and/or the pivot shaft by frictionally locking engagement or/and material cohesion as an alternative or in addition to the positively locking engagement described above. It goes without saying that the entire coupling arrangement may be integrated in the exhaust-gas flap in an inverse arrangement with respect to FIG. 1, such that the first coupling element is rotationally conjointly connected to the drive element and the second coupling element is rotationally conjointly connected to the pivot shaft. The rotational coupling cutouts that are provided on the second coupling element may also be delimited between respective wall portions which extend over a relatively large region along the outer peripheral region of the coupling region of the second coupling element and which protrude axially from the coupling region.

In the context of the present disclosure, a peripheral end region, which is close to a respective rotational coupling cutout, of such a wall portion is to be regarded as a rotational coupling finger.

It is understood that the foregoing description is that of the preferred embodiments of the invention and that various changes and modifications may be made thereto without departing from the spirit and scope of the invention as defined in the appended claims.

What is claimed is:

1. A coupling arrangement for rotationally coupling a drive element of a pivoting drive of an exhaust-gas flap for the exhaust-gas flow of an internal combustion engine to a pivot shaft rotatable about a pivot axis (A), the coupling arrangement comprising:
   a first coupling element having a first coupling region configured for coupling to said pivot shaft for conjoint rotation therewith about said pivot axis (A);
   a second coupling element having a second coupling region configured for coupling to said drive element for conjoint rotation therewith about said pivot axis (A);
   a preload element configured for generating a force to act upon said first and second coupling elements substantially in a peripheral direction with respect to each other;
   one of said first and second coupling elements including at least two rotational-coupling projections extending radially outward relative to the coupling region of said one coupling element;
   the other one of said first and second coupling elements having rotational-coupling cutouts corresponding to respective ones of said at least two rotational-coupling projections for receiving said at least two rotational-coupling projections;
   each of said rotational-coupling projections having a peripheral support region and each of said rotational-coupling cutouts being delimited, in peripheral direction, by a counter peripheral support region;
   the peripheral support region of each rotational-coupling projection being preloaded by said preload element so as to abut against the counter peripheral support region of the rotational-coupling cutout receiving a corresponding one of said rotational-coupling projections;
   a radial support region substantially radially supporting said one coupling element with respect to said other coupling element;
   said radial support region being provided on said one coupling element assigned to at least one of said rotational-coupling projections, in the peripheral direction, on at least one side of the rotational-coupling projection;
   said other coupling element having two rotational-coupling fingers extending substantially axially in a direction away from said coupling region of said other coupling element; and,
   said two rotational-coupling fingers delimiting therebetween one of said rotational-coupling cutouts.

2. The coupling arrangement of claim 1, wherein:
   said other one of said coupling elements has a rotational-coupling arm extending substantially axially away from said coupling region of said other one of said coupling elements;
   said two rotational-coupling fingers extend from said rotational-coupling arm to define a corresponding one of said rotational-coupling cutouts; and,
   said coupling arrangement further includes at least one of a T-shaped cutout and an extending cutout configured in said coupling region of said other one of said coupling elements in association with said rotational-coupling arm.

3. The coupling arrangement of claim 1, wherein:
   said radial support region is configured to substantially radially support said one coupling element relative to said other coupling element; and,
   said radial support region is assigned to at least one of said rotational-coupling projections, in peripheral direction, on both sides of said one rotational-coupling projection.

4. The coupling arrangement of claim 1, wherein said radial support region has a radial support projection arranged with a peripheral spacing to the rotational-coupling projection assigned thereto.

5. The coupling arrangement of claim 1, wherein said radial support region is formed as an outer peripheral region of the coupling region of said one coupling element.

6. The coupling arrangement of claim 1, wherein said radial support region is configured to be assigned to a single one of said rotational-coupling projections, in a peripheral direction, on at least one side of the rotational-coupling projection.

7. The coupling arrangement of claim 5, wherein one of said rotational-coupling projections has a peripheral region without said radial support region assigned; and, said outer peripheral region of said coupling region of said one coupling element is arranged at a radial spacing from said other coupling element.

8. The coupling arrangement of claim 1, wherein said preload element generates a force which preloads said radial support region so as to abut against said other coupling element.

9. The coupling arrangement of claim 1, wherein said preload element is configured to generate an axial force, which acts in an axial direction, between the first coupling element and the second coupling element; each rotational-coupling cutout is open axially in the direction away from the coupling region of said other coupling element for receiving the assigned rotational coupling projection; and, said one coupling element is held axially on said other coupling element by said preload element so as to prevent said rotational-coupling projections from moving out of the rotational-coupling cutouts wherein they are accommodated.

10. The coupling arrangement of claim 1, wherein said two rotational-coupling projections extend away from one another in a substantially diametrically opposed manner with respect to the pivot axis (A) and are provided on said one coupling element.

11. The coupling arrangement of claim 1, wherein the preload element includes a preload spring having a first support region which is supported at least in a first peripheral direction with respect to the first coupling element and at least axially in the direction of the second coupling element; and, a second support region which is supported at least in a second peripheral direction, opposite to the first peripheral direction, with respect to said second coupling element and at least axially in the direction of said first coupling element.

12. The coupling arrangement of claim 1, wherein the first coupling region of said first coupling element has a substantially plate-like form.

13. The coupling arrangement of claim 1, wherein said first coupling region of said first coupling element has a positively locking engagement formation for rotational coupling to said pivot shaft.

14. The coupling arrangement of claim 1, wherein the first coupling region of said first coupling element has a substantially plate-like form; and, said first coupling region of said first coupling element has a positively locking engagement formation for rotational coupling to said pivot shaft.

15. The coupling arrangement of claim 1, wherein the second coupling region of said second coupling element is of substantially plate-like form.

16. The coupling arrangement of claim 1, wherein said second coupling region of said second coupling element has a positively locking engagement formation for rotational coupling to said drive element.

17. The coupling arrangement of claim 1, wherein the second coupling region of said second coupling element is of substantially plate-like form; and, the second coupling region of said second coupling element has a positively locking engagement formation for rotational coupling to said drive element.

18. An exhaust-gas flap assembly including for an exhaust-gas flow of an internal combustion engine passing through a flap pipe defining an interior for accommodating said exhaust-gas flow, the exhaust-gas flap assembly comprising:
a pivot shaft supported in said flap pipe so as to be pivotable about a pivot axis (A);
a flap carried in said interior of said flap pipe on said pivot shaft;
a pivot drive having a drive element; and,
a coupling arrangement for rotatably coupling said pivot shaft to said drive element;
said coupling arrangement including:
a first coupling element having a first coupling region configured for coupling to said pivot shaft for conjoint rotation therewith about said pivot axis (A);
a second coupling element having a second coupling region configured for coupling to said drive element for conjoint rotation therewith about said pivot axis (A);
a preload element configured for generating a force to act upon said first and second coupling elements substantially in a peripheral direction with respect to each other;
one of said first and second coupling elements including at least two rotational-coupling projections extending radially outward relative to the coupling region of said one coupling element;
the other one of said first and second coupling elements having rotational-coupling cutouts corresponding to respective ones of said at least two rotational-coupling projections for receiving said at least two rotational-coupling projections;
each of said rotational-coupling projections having a peripheral support region and each of said rotational-coupling cutouts being delimited, in peripheral direction, by a counter peripheral support region;
the peripheral support region of each rotational-coupling projection being preloaded by said preload element so as to abut against the counter peripheral support region of the rotational-coupling cutout receiving a corresponding one of said rotational-coupling projections;
a radial support region substantially radially supporting said one coupling element with respect to said other coupling element;
said radial support region being provided on said one coupling element assigned to at least one of said rotational-coupling projections, in the peripheral direction, on at least one side of the rotational-coupling projection;
said other coupling element having two rotational-coupling fingers extending substantially axially in a direction away from said coupling region of said other coupling element; and,
said two rotational-coupling fingers delimiting therebetween one of said rotational-coupling cutouts.

19. A coupling arrangement for rotationally coupling a drive element of a pivoting drive of an exhaust-gas flap for the exhaust-gas flow of an internal combustion engine to a pivot shaft rotatable about a pivot axis (A), the coupling arrangement comprising:
a first coupling element having a first coupling region configured for coupling to said pivot shaft for conjoint rotation therewith about said pivot axis (A);
a second coupling element having a second coupling region configured for coupling to said drive element for conjoint rotation therewith about said pivot axis (A);
a preload element configured for generating a force to act upon said first and second coupling elements substantially in a peripheral direction with respect to each other;
one of said first and second coupling elements including at least two rotational-coupling projections extending radially outward relative to the coupling region of said one coupling element;
the other one of said first and second coupling elements having rotational-coupling cutouts corresponding to respective ones of said at least two rotational-coupling projections for receiving said at least two rotational-coupling projections;
each of said rotational-coupling projections having a peripheral support region and each of said rotational-coupling cutouts being delimited, in peripheral direction, by a counter peripheral support region;
the peripheral support region of each rotational-coupling projection being preloaded by said preload element so as to abut against the counter peripheral support region of the rotational-coupling cutout receiving a corresponding one of said rotational-coupling projections;

a radial support region substantially radially supporting said one coupling element with respect to said other coupling element;

said radial support region being provided on said one coupling element assigned to at least one of said rotational-coupling projections, in the peripheral direction, on at least one side of the rotational-coupling projection;

said preload element including a preload spring having a first support region which is supported at least in a first peripheral direction with respect to the first coupling element and at least axially in the direction of the second coupling element; and, a second support region which is supported at least in a second peripheral direction, opposite to the first peripheral direction, with respect to said second coupling element and at least axially in the direction of said first coupling element.

20. An exhaust-gas flap assembly including for an exhaust-gas flow of an internal combustion engine passing through a flap pipe defining an interior for accommodating said exhaust-gas flow, the exhaust-gas flap assembly comprising:

a pivot shaft supported in said flap pipe so as to be pivotable about a pivot axis (A);

a flap carried in said interior of said flap pipe on said pivot shaft;

a pivot drive having a drive element; and, a coupling arrangement for rotatably coupling said pivot shaft to said drive element;

said coupling arrangement including:

a first coupling element having a first coupling region configured for coupling to said pivot shaft for conjoint rotation therewith about said pivot axis (A);

a second coupling element having a second coupling region configured for coupling to said drive element for conjoint rotation therewith about said pivot axis (A);

a preload element configured for generating a force to act upon said first and second coupling elements substantially in a peripheral direction with respect to each other;

one of said first and second coupling elements including at least two rotational-coupling projections extending radially outward relative to the coupling region of said one coupling element;

the other one of said first and second coupling elements having rotational-coupling cutouts corresponding to respective ones of said at least two rotational-coupling projections for receiving said at least two rotational-coupling projections;

each of said rotational-coupling projections having a peripheral support region and each of said rotational-coupling cutouts being delimited, in peripheral direction, by a counter peripheral support region;

the peripheral support region of each rotational-coupling projection being preloaded by said preload element so as to abut against the counter peripheral support region of the rotational-coupling cutout receiving a corresponding one of said rotational-coupling projections;

a radial support region substantially radially supporting said one coupling element with respect to said other coupling element;

said radial support region being provided on said one coupling element assigned to at least one of said rotational-coupling projections, in the peripheral direction, on at least one side of the rotational-coupling projection;

said preload element including a preload spring having a first support region which is supported at least in a first peripheral direction with respect to the first coupling element and at least axially in the direction of the second coupling element; and, a second support region which is supported at least in a second peripheral direction, opposite to the first peripheral direction, with respect to said second coupling element and at least axially in the direction of said first coupling element.

21. A coupling arrangement for rotationally coupling a drive element of a pivoting drive of an exhaust-gas flap for the exhaust-gas flow of an internal combustion engine to a pivot shaft rotatable about a pivot axis (A), the coupling arrangement comprising:

a first coupling element having a first coupling region configured for coupling to said pivot shaft for conjoint rotation therewith about said pivot axis (A);

a second coupling element having a second coupling region configured for coupling to said drive element for conjoint rotation therewith about said pivot axis (A);

a preload element configured for generating a force to act upon said first and second coupling elements substantially in a peripheral direction with respect to each other;

one of said first and second coupling elements including at least two rotational-coupling projections extending radially outward relative to the coupling region of said one coupling element;

the other one of said first and second coupling elements having rotational-coupling cutouts corresponding to respective ones of said at least two rotational-coupling projections for receiving said at least two rotational-coupling projections;

each of said rotational-coupling projections having a peripheral support region and each of said rotational-coupling cutouts being delimited, in peripheral direction, by a counter peripheral support region;

the peripheral support region of each rotational-coupling projection being preloaded by said preload element so as to abut against the counter peripheral support region of the rotational-coupling cutout receiving a corresponding one of said rotational-coupling projections;

a radial support region substantially radially supporting said one coupling element with respect to said other coupling element;

said radial support region being provided on said one coupling element assigned to at least one of said rotational-coupling projections, in the peripheral direction, on at least one side of the rotational-coupling projection; and, said radial support region having a radial support projection arranged with a peripheral spacing to the rotational-coupling projection assigned thereto.

22. An exhaust-gas flap assembly including for an exhaust-gas flow of an internal combustion engine passing through a flap pipe defining an interior for accommodating said exhaust-gas flow, the exhaust-gas flap assembly comprising:

a pivot shaft supported in said flap pipe so as to be pivotable about a pivot axis (A);

a flap carried in said interior of said flap pipe on said pivot shaft;

a pivot drive having a drive element; and, a coupling arrangement for rotatably coupling said pivot shaft to said drive element;

said coupling arrangement including:

a first coupling element having a first coupling region configured for coupling to said pivot shaft for conjoint rotation therewith about said pivot axis (A);

a second coupling element having a second coupling region configured for coupling to said drive element for conjoint rotation therewith about said pivot axis (A);

a preload element configured for generating a force to act upon said first and second coupling elements substantially in a peripheral direction with respect to each other;

one of said first and second coupling elements including at least two rotational-coupling projections extending radially outward relative to the coupling region of said one coupling element;

the other one of said first and second coupling elements having rotational-coupling cutouts corresponding to respective ones of said at least two rotational-coupling projections for receiving said at least two rotational-coupling projections;

each of said rotational-coupling projections having a peripheral support region and each of said rotational-coupling cutouts being delimited, in peripheral direction, by a counter peripheral support region;

the peripheral support region of each rotational-coupling projection being preloaded by said preload element so as to abut against the counter peripheral support region of the rotational-coupling cutout receiving a corresponding one of said rotational-coupling projections;

a radial support region substantially radially supporting said one coupling element with respect to said other coupling element;

said radial support region being provided on said one coupling element assigned to at least one of said rotational-coupling projections, in the peripheral direction, on at least one side of the rotational-coupling projection; and, said radial support region having a radial support projection arranged with a peripheral spacing to the rotational-coupling projection assigned thereto.

* * * * *